(12) United States Patent
Hachiya et al.

(10) Patent No.: US 6,341,051 B2
(45) Date of Patent: *Jan. 22, 2002

(54) DISK DRIVE HAVING EXTERNAL SHOCK RESISTANCE

(75) Inventors: Toshiyuki Hachiya, Higashine; Tomoyoshi Yamada; Hiroshi Takekawa, both of Kawasaki; Takuya Kobayashi, Higashine; Yuji Sasaki, Kawasaki, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/536,775

(22) Filed: Mar. 28, 2000

Related U.S. Application Data

(62) Division of application No. 09/152,811, filed on Sep. 14, 1998, now abandoned.

(30) Foreign Application Priority Data

Mar. 16, 1998 (JP) ............................................ 10-065036

(51) Int. Cl.⁷ .............................. G11B 5/55; G11B 17/02

(52) U.S. Cl. .................................. 360/265.1; 360/97.01
(58) Field of Search ........................... 360/97.01–99.12, 360/254.7–255, 128; 366/265.1

(56) References Cited

U.S. PATENT DOCUMENTS

| | | | | | |
|---|---|---|---|---|---|
| 4,843,503 | A | * | 6/1989 | Hazebrouck et al. | 360/106 |
| 5,231,549 | A | * | 7/1993 | Morehouse et al. | 360/105 |
| 5,526,206 | A | * | 6/1996 | Shimizu | 360/105 |
| 5,801,899 | A | * | 9/1998 | Genheimer | 360/97.01 |
| 6,091,576 | A | * | 7/2000 | Eckerd et al. | 360/105 |

\* cited by examiner

*Primary Examiner*—Robert S. Tupper
(74) *Attorney, Agent, or Firm*—Greer, Burns & Crain, Ltd.

(57) ABSTRACT

A disk drive including a disk rotatably mounted in a housing and having a plurality of tracks, a rotating mechanism for rotating the disk, a head slider having a transducer for reading/writing data on the disk, and an actuator for moving the head slider across the tracks. The actuator includes an actuator arm rotatably mounted in the housing, a suspension having a front end portion for supporting the head slider and a base end portion fixed to the actuator arm, and a pad mounted on a disk opposing surface of the actuator arm. The pad overlaps at least an outermost circumferential portion of the disk in a specific position of the actuator upon stoppage of driving of the disk drive.

12 Claims, 23 Drawing Sheets

(A)

(B)

DISK DRIVE HAVING EXTERNAL SHOCK RESISTANCE

This is a divisional of application Ser. No. 09/152,811, filed Sep. 14, 1998.

BACKGROUND OF THE INVENTION

1. Field of the Invention

The present invention relates generally to a disk drive, and more particularly to a disk drive designed to prevent contact of a disk and an actuator arm due to an external shock.

2. Description of the Related Art

In a conventional magnetic disk drive, there is case that an actuator arm or a spindle on which a magnetic disk is mounted that may be tilted to some extent by an external shock exerted on the magnetic disk drive. In such a case, the front end of the actuator arm comes closest to the magnetic disk, because the actuator arm is unusually flat in shape. Further, since the actuator arm is supported in a cantilever fashion, the amplitude of vertical vibration of the actuator arm due to the external shock is largest at the front end of the arm. Therefore, after experiencing the external shock, the tilt of the actuator or the spindle is associated with the vertical displacement of the actuator arm, resulting in a structure such that the front end of the actuator arm tends to come into contact with a data region of the magnetic disk.

In general, a magnetic disk drive sometimes receives an external shock while mounting it into a computer, carrying a portable computer in which the disk drive is built, etc. Therefore it is necessary to improve the external shock resistance of a magnetic disk drive. However, due to a recent decrease in the size of a magnetic head in response to a decrease in thickness and an increase in storage capacity in a magnetic disk drive, a magnetic head mounting height (the distance between an actuator arm and a magnetic disk) becomes as a result, as a result the allowable amplitude of vertical vibration of the actuator arm upon receipt of an external shock is reduced. Accordingly, when the magnetic disk drive receives an external shock, the front end of the actuator arm tends to come into contact with the magnetic disk surface, causing damage to the data region of the magnetic disk. Further, in many cases, a magnetic disk drive having a small number of magnetic disks adopts a single-supported spindle structure such that a spindle shaft is fixed to a base only, from a cost-reduction viewpoint. However, this structure is inferior to a double-supported spindle structure in that the spindle shaft it is more, causing a problem where the outermost circumferential portion of the magnetic disk tends to come into contact with the actuator arm facing thereto.

SUMMARY OF THE INVENTION

It is therefore an object of the present invention to provide a disk drive which can minimize the vibrations of the actuator arms and the disks when the disk drive receives an external shock, thereby preventing damage to the disks.

In accordance with an aspect of the present invention, a disk drive comprising a housing; a disk rotatably mounted in said housing and having a plurality of tracks; a rotating mechanism for rotating said disk; a head slider having a transducer for reading/writing data on said disk; and an actuator for moving said head slider across said tracks of said disk; said actuator comprising an actuator arm rotatably mounted in said housing; a suspension having a front end portion for supporting said head slider and a base end portion fixed to a front end portion of said actuator arm; and a pad mounted on a disk opposing surface of said actuator arm; said pad overlapping at least an outermost circumferential portion of said disk in a specific position of said actuator upon stoppage of driving of said disk drive.

Preferably, the pad is formed of resin or rubber, and overlaps a non-data region formed in the outermost circumferential portion of the disk. The thickness of the pad is set preferably smaller than the thickness of the head slider. By mounting the pad on the actuator arm, a clearance between the actuator arm and the disk at the outermost circumferential portion of the disk in a direction perpendicular to the disk surface' can be reduced. Accordingly, even when the disk drive receives an external shock, the pad mounted on the actuator arm comes into contact with the outermost circumferential portion (the non-data region) of the disk, thereby limiting a tilt of the actuator or the spindle to prevent contact of the front end of the actuator arm with a data region of the disk.

In accordance with another aspect of the present invention, a disk drive comprising a housing having a base and a cover fixed to said base; a disk rotatably mounted in said housing and having a plurality of tracks; a rotating mechanism for rotating said disk; a head slider having a transducer for reading/writing data on said disk; an actuator for moving said head slider across said tracks of said disk; and a stopper fixed to said base, said stopper having a groove for receiving an outermost circumferential portion of said disk with a given vertical clearance.

In a disk drive wherein the actuator takes a rest position in the outermost circumferential portion of the disk upon stoppage of driving of the disk drive, a stopper for suppressing the vertical vibration of the actuator arm at the rest position of the actuator may be fixed to the base.

In accordance with a further aspect of the present invention, a disk drive comprising a housing; a disk rotatably mounted in said housing and having a plurality of tracks; a rotating mechanism for rotating said disk; a head slider having a transducer for reading/writing data on said disk; and an actuator for moving said head slider across said tracks of said disk; said actuator comprising an actuator arm rotatably mounted in said housing; a spacer fixed to a front end portion of said actuator arm; a suspension having a front end portion for supporting said head slider and a base end portion fixed to said spacer; and a pad provided on a disk opposing surface of said actuator arm at a position near said spacer.

Preferably, the pad is formed of resin or rubber, and the thickness of the pad is set smaller than the thickness of the head slider.

In accordance with a still further aspect of the present invention, a disk drive comprising a housing having a base and a cover fixed to said base; a spindle assembly having a shaft fixed to said base, a spindle hub rotatably mounted on said shaft, and a motor for rotating said spindle hub; a disk mounted on said spindle hub and having a plurality of tracks; a head slider having a transducer for reading/writing data on said disk; and an actuator for moving said head slider across said tracks of said disk; said spindle hub being integrally formed at its upper end with an annular projection; said cover having a circular recess for receiving said annular projection with a given horizontal clearance.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
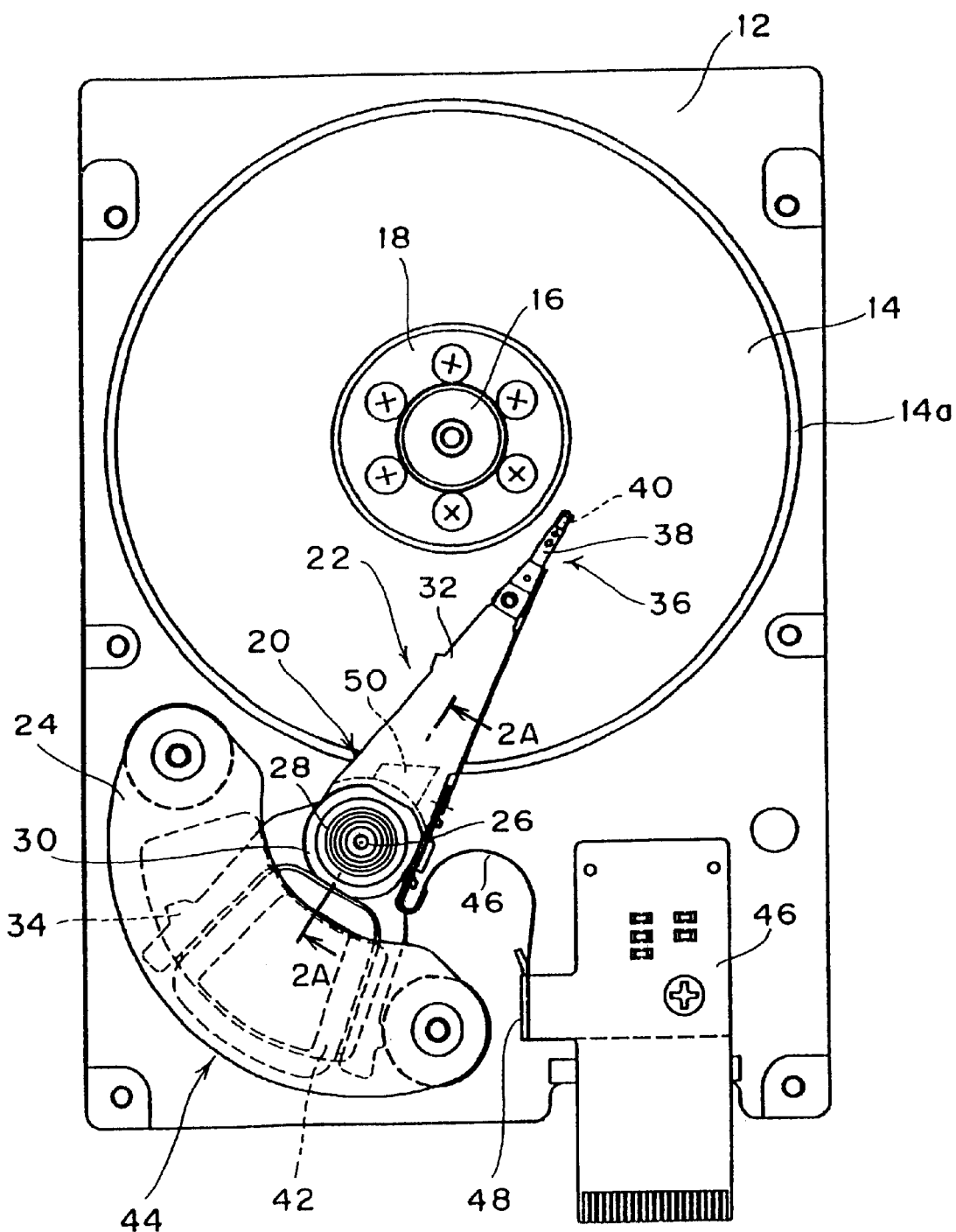
FIG. 1 is a plan view of a magnetic disk drive according to a first preferred embodiment of the present invention.

Various preferred embodiments of the present invention will now be described in detail with reference to the drawings. In the following description of the preferred embodiments, substantially the same parts will be denoted by the same reference numerals.

Referring to FIG. 1, a plan view of a magnetic disk drive is shown according to a first preferred embodiment of the present invention in the condition where a cover has been removed. A spindle hub (not shown) rotatably driven by a motor 16 is provided on a base 12. A plurality of magnetic disks 14 and spacers (not shown) are mounted on the spindle hub in such a manner as to be alternately stacked. That is, the plural magnetic disks 14 are fixedly mounted on the spindle hub by securing a disk clamp 18 to the spindle hub by screws, and are equally spaced a given distance by the spacers.

Reference numeral 20 denotes a rotary actuator consisting of an actuator assembly 22 and a magnetic circuit 24. The actuator assembly 22 is rotatably mounted on a shaft 26 fixed to the base 12. The actuator assembly 22 includes an actuator block 30 rotatably mounted on the shaft 26 through a bearing 28, a plurality of actuator arms 32 integral with the actuator block 30 and extending radially therefrom in one direction, and a coil supporting member 34 integral with the actuator block 30 and extending radially therefrom in a direction opposite to the direction of extension of the actuator arms 32.

A head assembly 36 is fixed to a front end portion of each actuator arm 32, and a head slider 40 is mounted on a front end portion of the suspension 38. The suspension 38 and the head slider 40 constitute a head assembly 36. The head slider 40 has a transducer for reading/writing data on the corresponding magnetic disk 14. A coil 42 is supported by the coil supporting member 34. The magnetic circuit 24 and the coil 42 inserted in a gap of the magnetic circuit 24 constitute a voice coil motor (VCM) 44.

Reference numeral 46 denotes a main flexible printed circuit board (main FPC) for taking a read signal from the transducer mounted on the head slider 40 and supplying a write signal to the transducer. The read/write FPC 46 has a read/write amplifier, passive electronic components, etc. The main FPC 46 is fixed at its one end portion to the side surface of the actuator block 30. An intermediate portion of the main FPC 46 is vertically fixed to the base 12 by a fixing member 48, and the other end portion of the main FPC 46 is horizontally mounted on the base 12.

Figure 2:
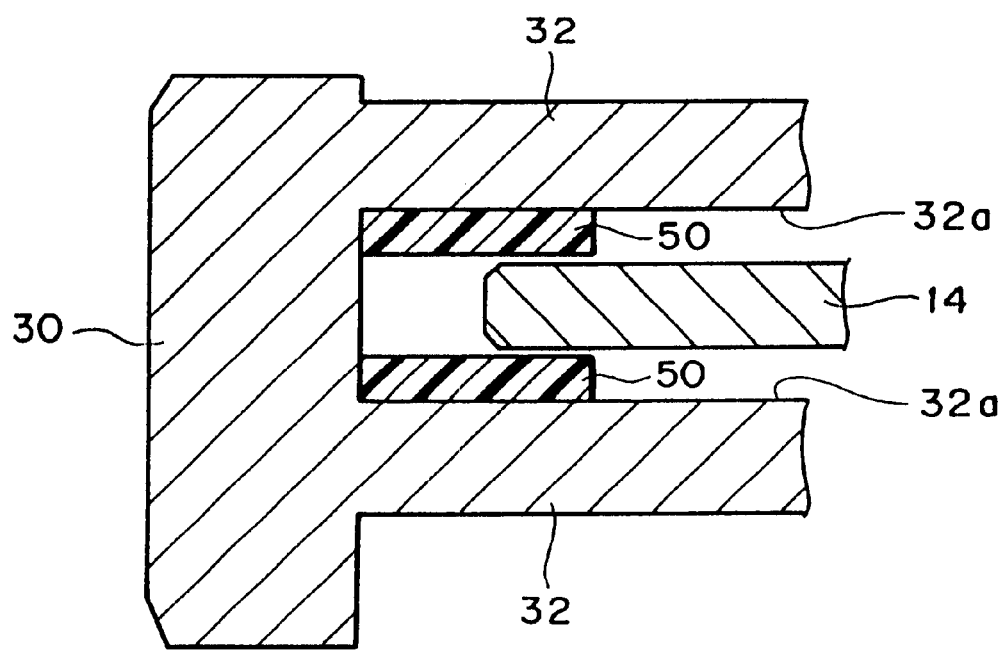
FIG. 2 is a cross section taken along the line 2A—2A in FIG. 1.

As best shown in FIG. 2 which is a cross section taken along the line 2A—2A in FIG. 1, pads 50 are mounted on the side surface of the actuator block 30 so as to extend along disk opposing surfaces 32a the actuator arms 32 which face the recording surfaces of the magnetic disks 14. Each magnetic disk 14 has a non-data region 14a circularly extending along the outer circumference of the disk 14 on each side and having a width of about 2 mm. In a contact start and stop (CSS) position of the actuator 20 shown in FIG. 1 where the magnetic disk drive is not driven, that is, the magnetic disks 14 are not rotated, the pads 50 overlap the non-data regions 14a of the magnetic disks 14.

As shown in FIG. 2, a very small clearance (0.1 to 0.2 mm) is defined between each pad 50 and the corresponding magnetic disk 14. Preferably, each pad 50 is formed of resin or rubber. Further, the thickness of each pad 50 is set preferably smaller than the thickness of the head slider 40 mounted on each suspension 38. While each pad 50 has a length along the corresponding actuator arm 32 enough to overlap the non-data region 14a of the corresponding magnetic disk 14 in the CSS position of the actuator 20 as shown in FIG. 1, each pad 50 may extend from the actuator block 30 over a distance up to the half or less of the entire length of the corresponding actuator arm 32. As a modification, each pad 50 may be mounted on the disk opposing surface 32a of the corresponding actuator arm 32.

In this preferred embodiment, each pad 50 is mounted on the actuator block 30 or the disk opposing surface 32a of the corresponding actuator arm 32. Accordingly, a vertical clearance between each actuator arm 32 and the disk surface opposed thereto at the outermost circumferential portion of each magnetic disk 14 is reduced in the CSS position of the actuator 20. As a result, even when the magnetic disk drive receives an external shock, each pad 50 comes into contact with the non-data region 14a of the corresponding magnetic disk 14, thereby limiting a tilt of the actuator 20 or the spindle. Therefore, it is possible to prevent that the front end of each actuator arm 32 may come into contact with the disk surface (data region) of the corresponding magnetic disk 14.

Figure 3:
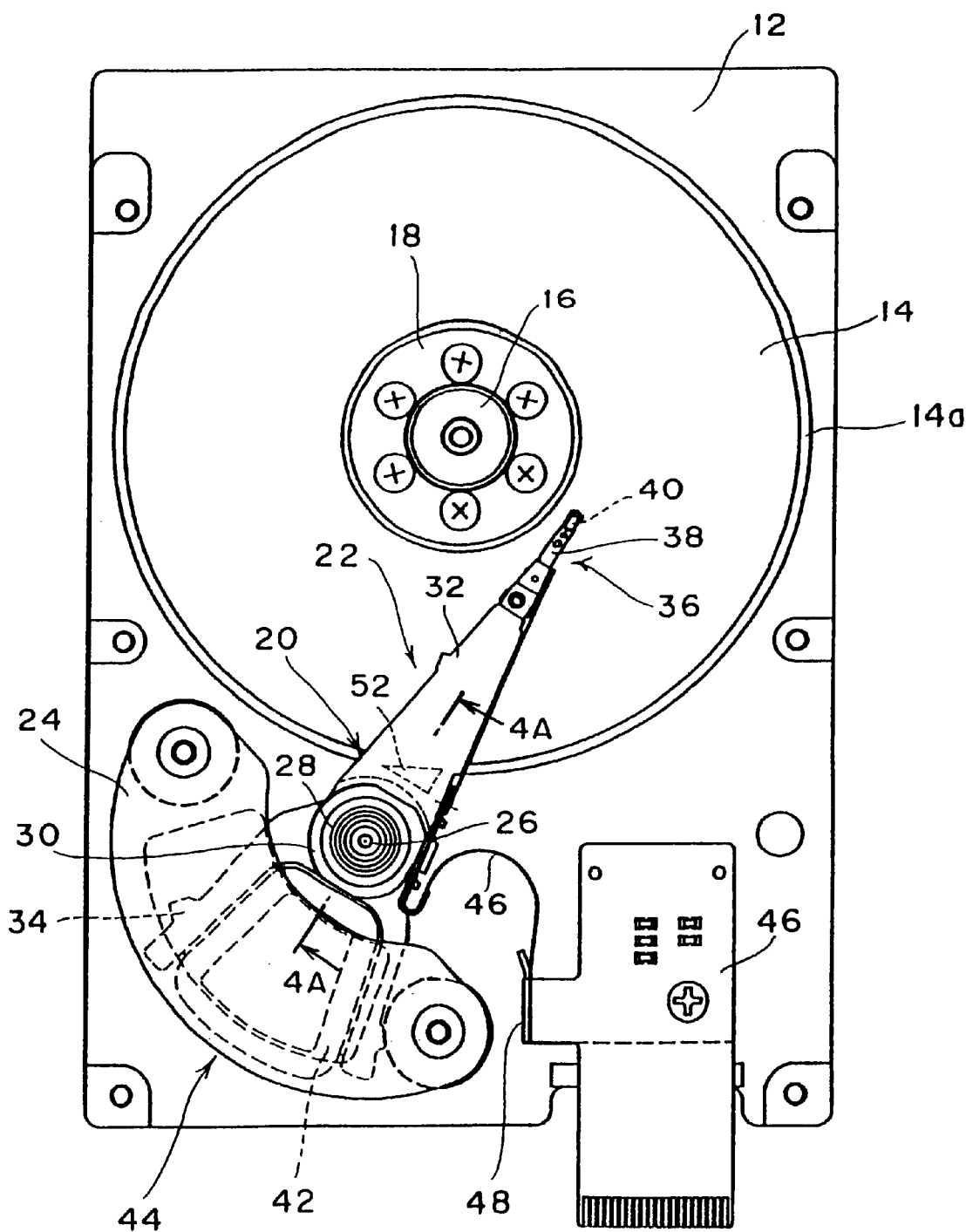
FIG. 3 is a plan view of a magnetic disk drive according to a second preferred embodiment of the present invention.
Figure 4:
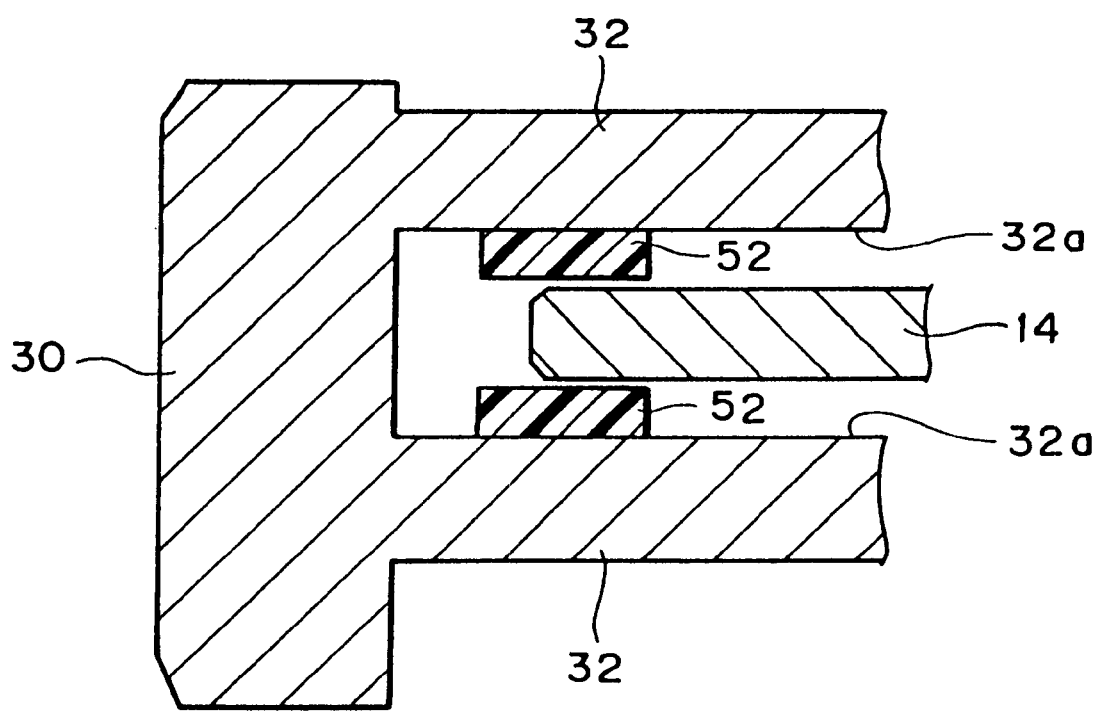
FIG. 4 is a cross section taken along the line 4A—4A in FIG. 3.

FIG. 3 is a plan view of a magnetic disk drive according to a second preferred embodiment of the present invention, and FIG. 4 is a cross section taken along the line 4A—4A in FIG. 3. This preferred embodiment employs pads 52 different in shape from the pads 50 used in the first preferred embodiment. Each pad 52 is mounted on the disk opposing surface 32a of the corresponding actuator arm 32. The operation of this preferred embodiment is similar to that of the first preferred embodiment.

Figure 5:
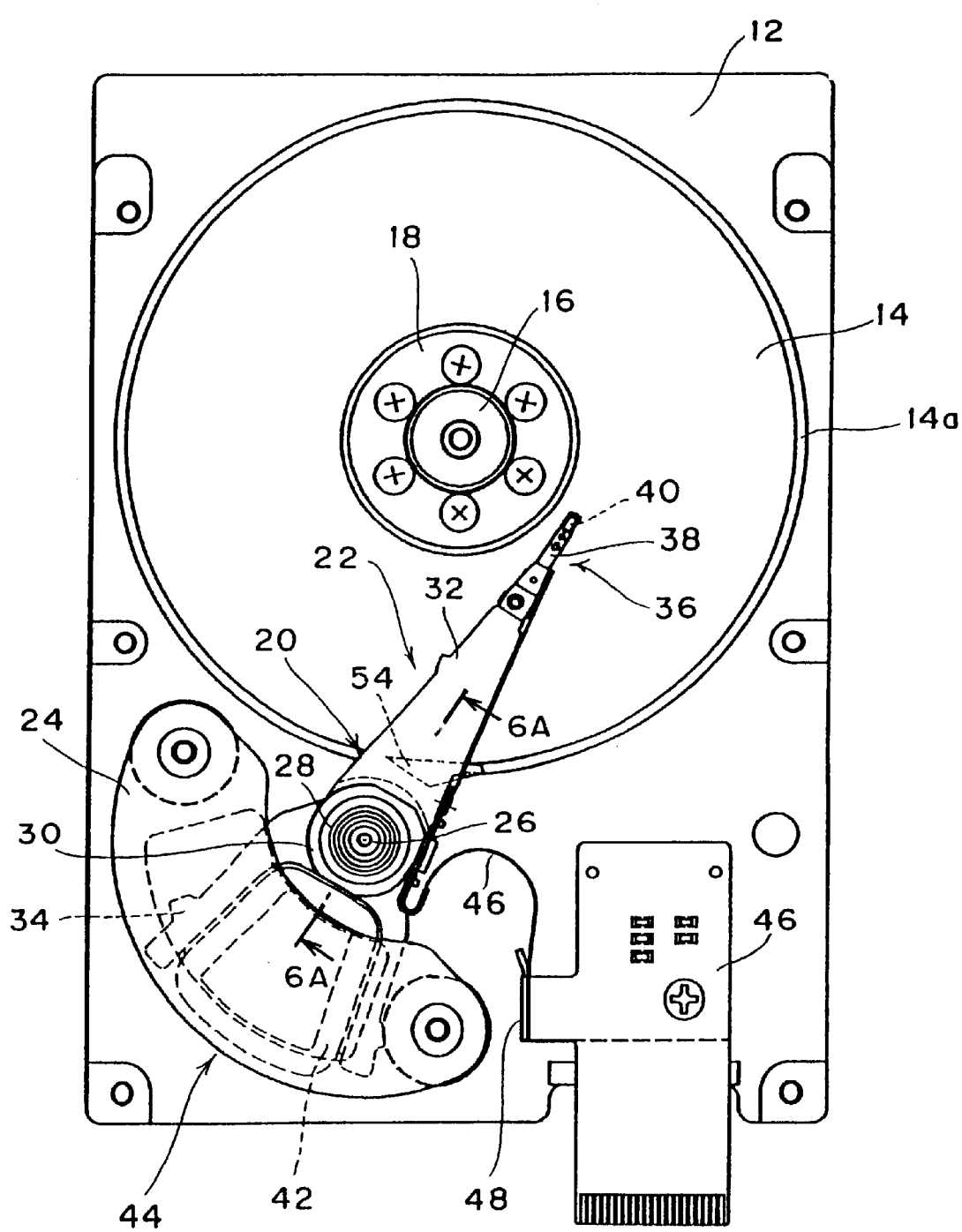
FIG. 5 is a plan view of a magnetic disk drive according to a third preferred embodiment of the present invention.
Figure 6:
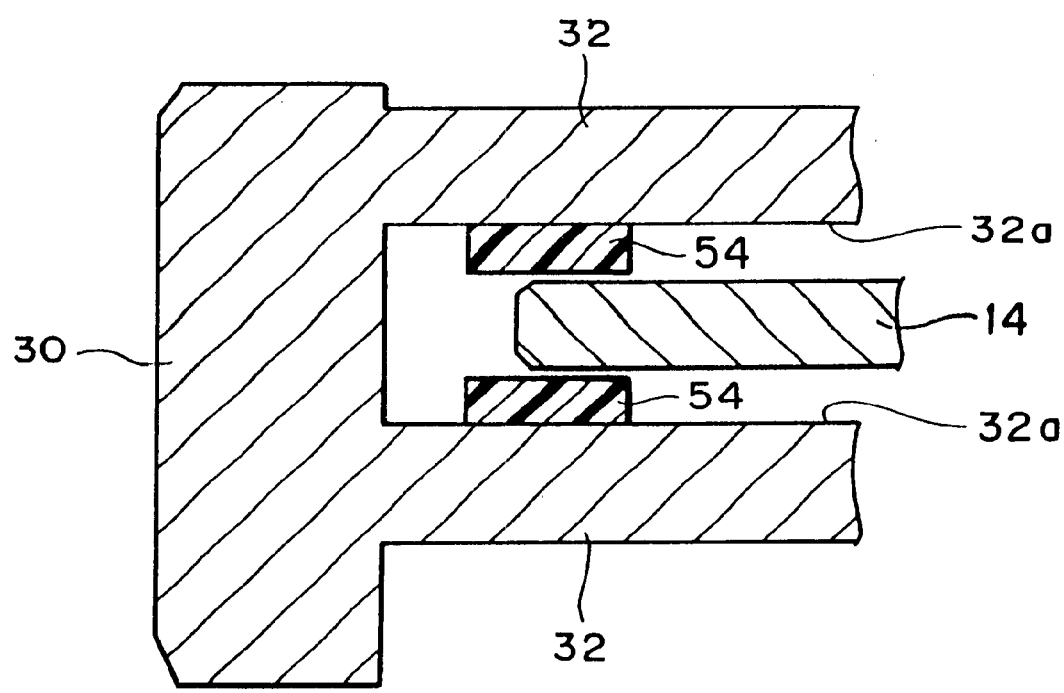
FIG. 6 is a cross section taken along the line 6A—6A in FIG. 5.

FIG. 5 is a plan view of a magnetic disk drive according to a third preferred embodiment of the present invention, and FIG. 6 is a cross section taken along the line 6A—6A in FIG. 5. This preferred embodiment employs pads 54 larger in area than the pads 52 used in the second preferred embodiment. That is, each pad 54 is mounted on the disk opposing surface 32a of the corresponding actuator arm 32 so as to project from one side surface thereof. The operation of this preferred embodiment is similar to that of the first preferred embodiment.

Figure 7:
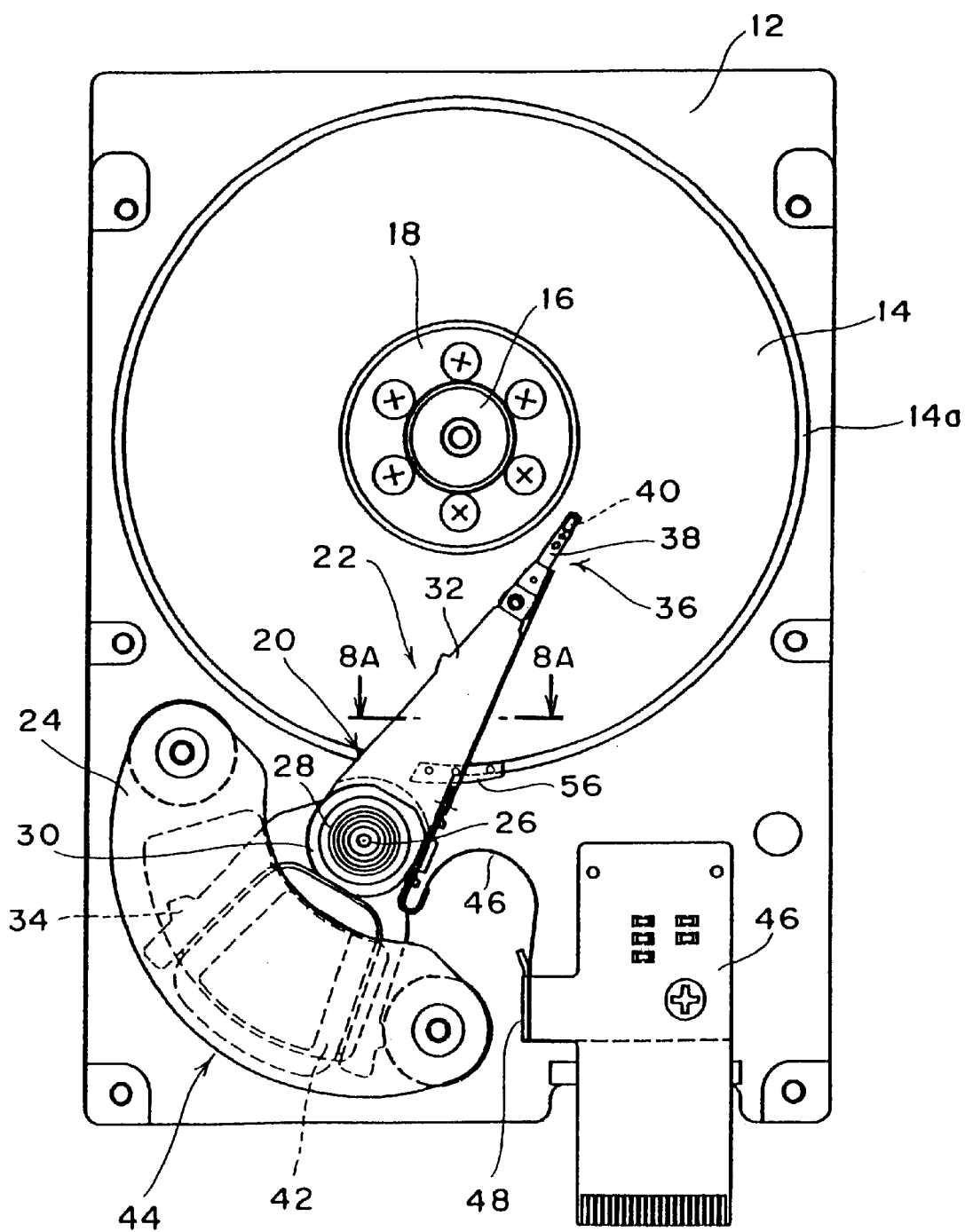
FIG. 7 is a plan view of a magnetic disk drive according to a fourth preferred embodiment of the present invention.
Figure 8:
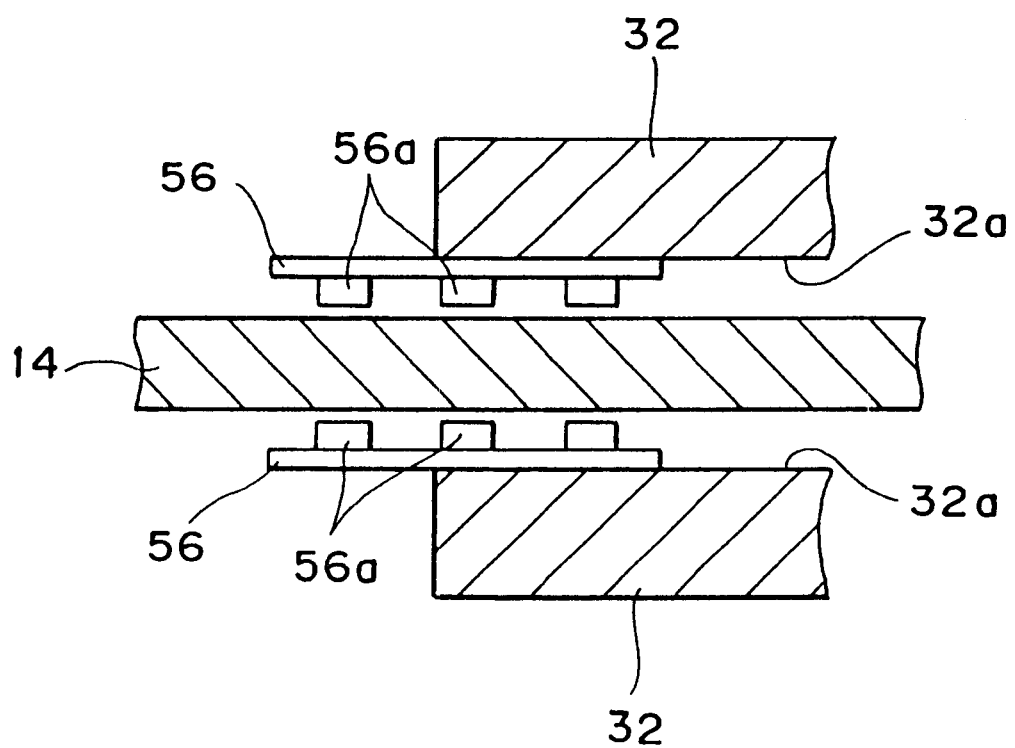
FIG. 8 is a cross section taken along the line 8A—8A in FIG. 7.

FIG. 7 is a plan view of a magnetic disk drive according to a fourth preferred embodiment of the present invention, and FIG. 8 is a cross section taken along the line 8A—8A in FIG. 7. This preferred embodiment employs pads 56 each having a plurality of projections 56a adapted to come into contact with the non-data region 14a. Each pad 56 is mounted on the disk opposing surface 32a of the corresponding actuator arm 32 so as to project from one side surface thereof. Also in this preferred embodiment, a similar effect can be obtained.

Figure 9:
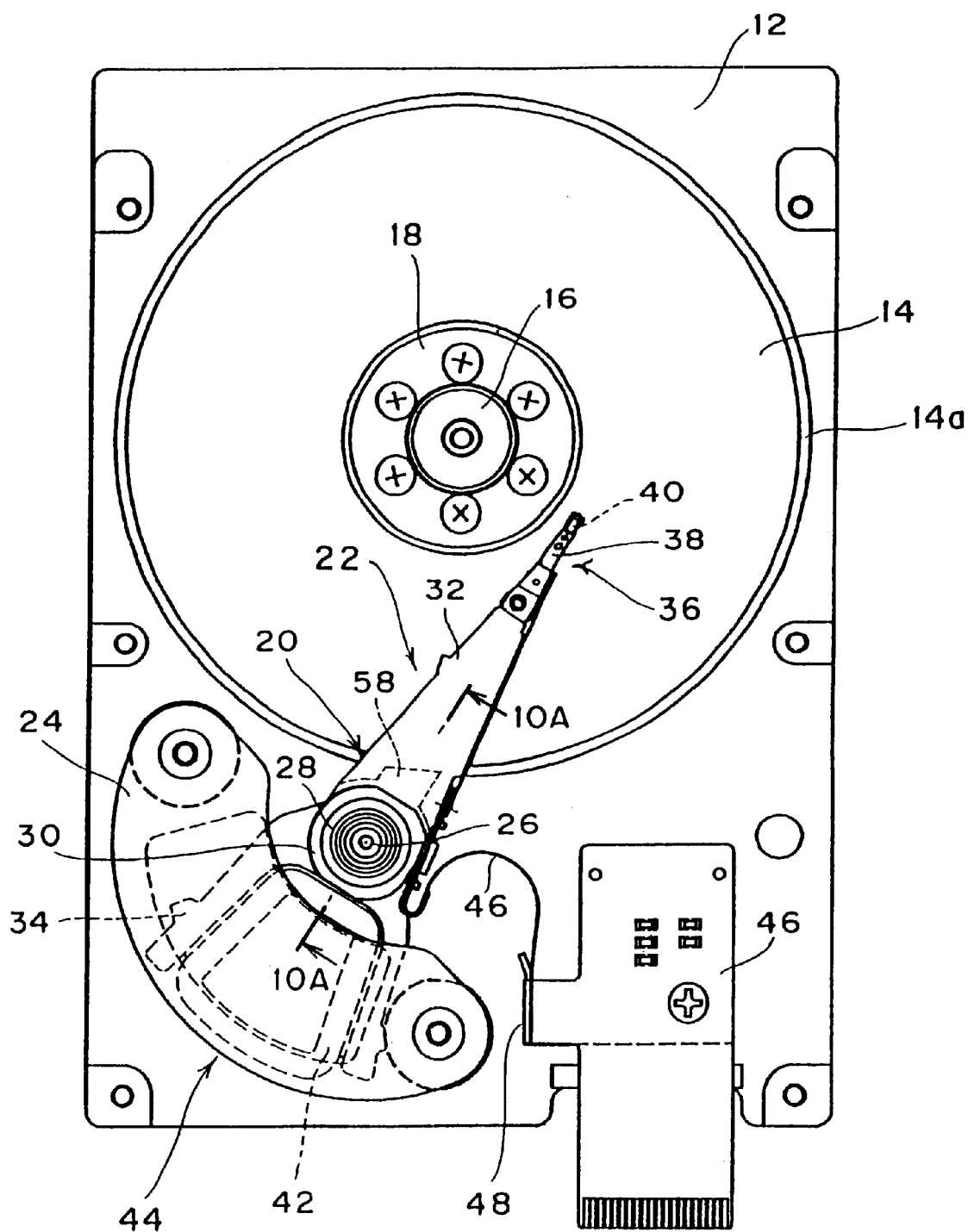
FIG. 9 is a plan view of a magnetic disk drive according to a fifth preferred embodiment of the present invention;.
Figure 10:
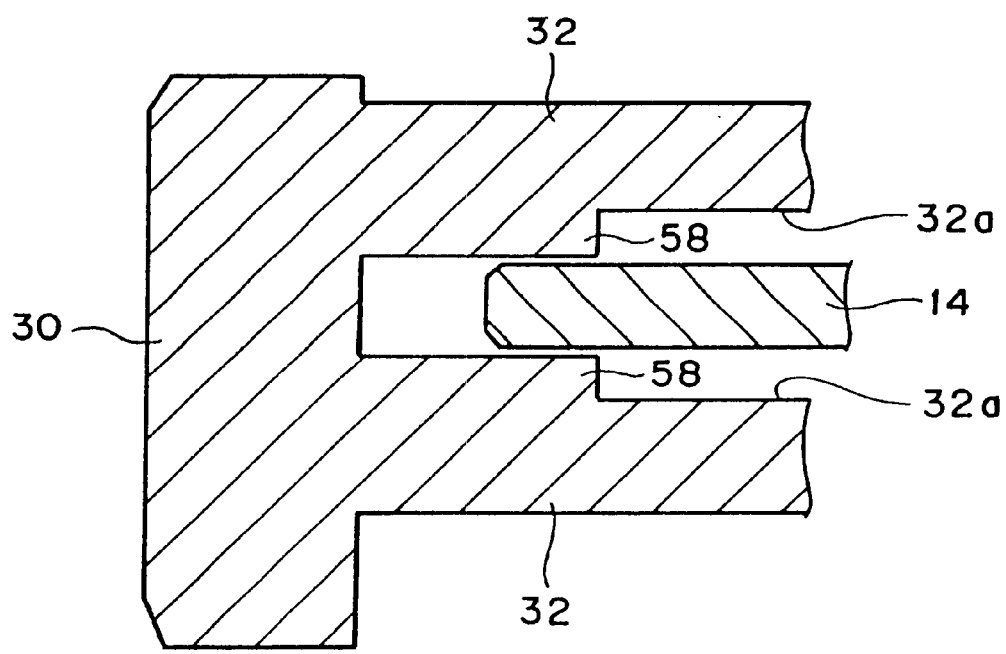
FIG. 10 is a cross section taken along the line 10A—10A in FIG. 9.

FIG. 9 is a plan view of a magnetic disk drive according to a fifth preferred embodiment of the present invention, and FIG. 10 is a cross section taken along the line 10A—10A in FIG. 9. In this preferred embodiment, each actuator arm 32 is integrally formed at its base end portion with a thick-walled portion 58. Each thick-walled portion 58 has a length along the corresponding actuator arm 32 enough to overlap the non-data region 14a of the corresponding magnetic disk 14 in the CSS position of the actuator 20. The thick-walled portions 58 are formed by aluminum die casting, for example, in manufacturing the actuator arms 32. The difference in thickness between the thick-walled portion 58 of each actuator arm 32 and the other portion thereof is set preferably smaller than the thickness of the head slider 40 mounted on each suspension 38. Each thick-walled portion 58 in this preferred embodiment functions like each pad used in the previous preferred embodiments.

Figure 11A:
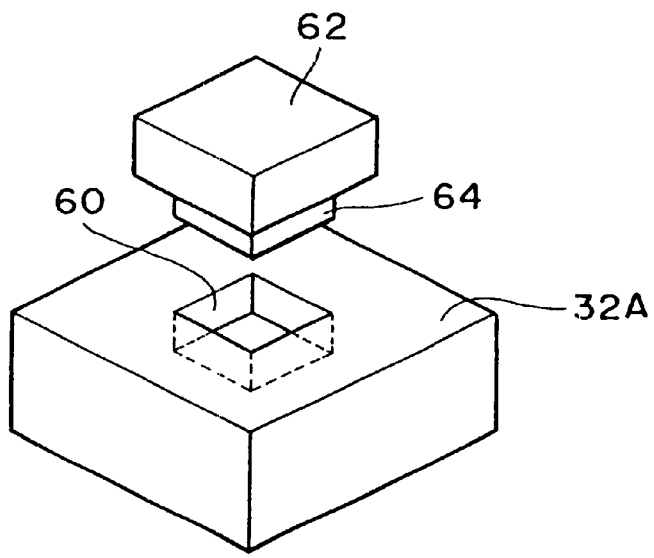
FIGS. 11A and 11B are schematic perspective views showing preferred embodiments of a pad mounting method.
Figure 11B:
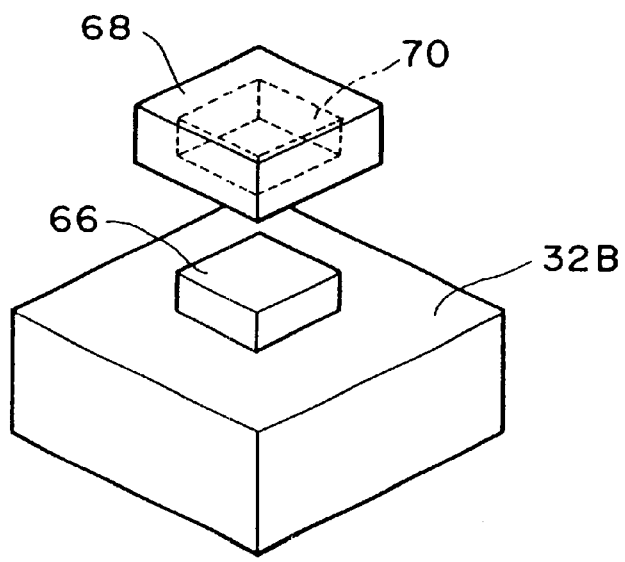

Referring to FIGS. 11A and 11B, there are shown schematic perspective views illustrating preferred embodiments of a pad mounting method. The preferred embodiment shown in FIG. 11A employs an actuator arm 32A having a recess 60 and a pad 62 having a projection 64 adapted to be closely fitted with the recess 60. Accordingly, by engaging the projection 64 into the recess 60, the pad 62 is mounted on the actuator arm 32A. FIG. 11B shows a modification of the method shown in FIG. 11A. This modification shown in FIG. 11B employs an actuator arm 32B having a projection 66 and a pad 68 having a recess 70 adapted to be closely fitted with the projection 66. Accordingly, by engaging the recess 70 with the projection 66, the pad 68 is mounted on the actuator arm 32B.

Figure 12A:
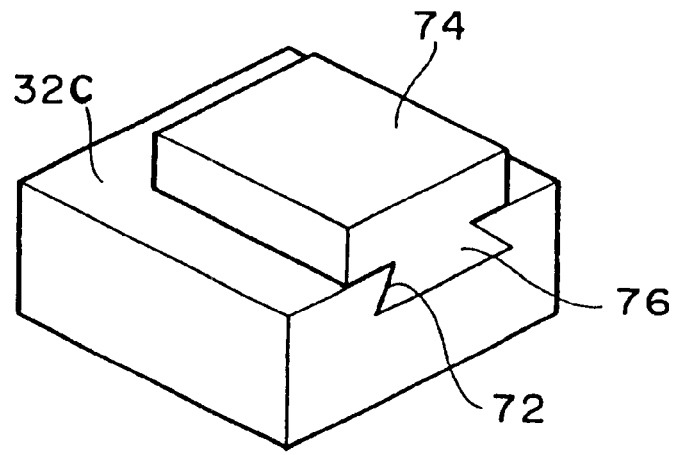
FIGS. 12A and 12B are schematic perspective views showing other preferred embodiments of the pad mounting method.
Figure 12B:
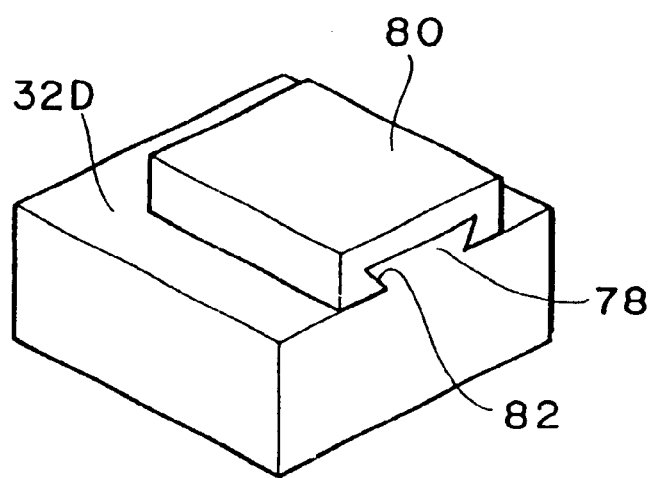

FIGS. 12A and 12B show other preferred embodiments of the pad mounting method. The preferred embodiment shown in FIG. 12A employs an actuator arm 32C having a groove 72 extending from an end surface of the actuator arm 32C in its longitudinal direction and a pad 74 having a dovetail-like rib 76 adapted to tightly fit into the groove 72. Accordingly, by inserting the rib 76 into the groove 72, the pad 74 is mounted on the actuator arm 32C. The preferred embodiment shown in FIG. 12B as a modification employs an actuator arm 32D having a dovetail-like rib 78 and a pad 80 having a groove 82 adapted to be tightly fitted with the rib 78. Accordingly, by fitting the groove 82 with sliding the rib 78, the pad 80 is mounted on the actuator arm 32D.

Figure 13:
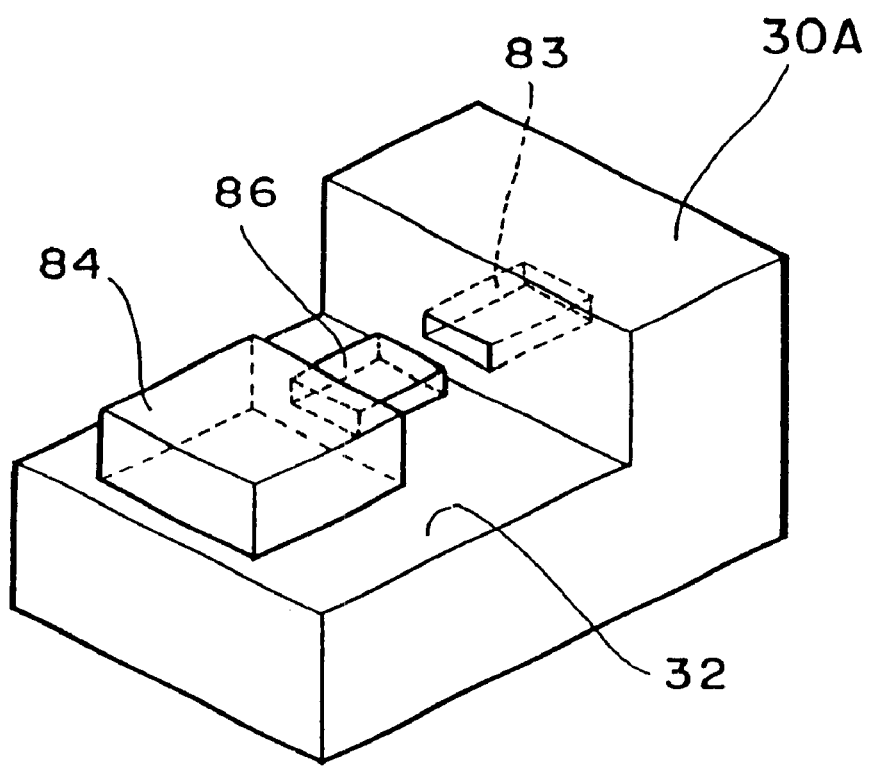
FIG. 13 is a schematic perspective view showing a still another preferred embodiment of the pad mounting method.

FIG. 13 shows another preferred embodiment of the pad mounting method. This preferred embodiment employs an actuator block 30A having a recess 83 and a pad 84 having a projection 86 adapted to be closely fitted with the recess 83. Accordingly, by engaging the projection 86 into the recess 83, the pad 84 is mounted on the actuator block 30A. Although not shown, the pads to be mounted on the upper and lower surfaces of the adjacent actuator arms 32 may be integrated together to provide a U-shaped pad to be mounted on actuator block 30.

Figure 14:
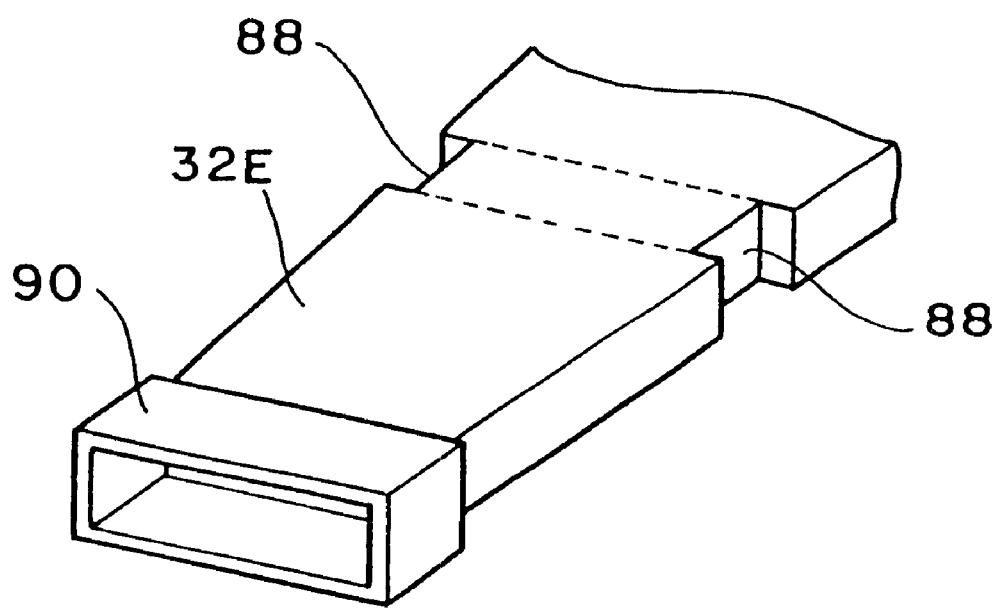
FIG. 14 is a schematic perspective view showing a further preferred embodiment of the pad mounting method.

FIG. 14 shows a still another preferred embodiment of the pad mounting method. This preferred embodiment employs an actuator arm 32E having a pair of notches 88 on the opposite side surfaces and a ringlike pad 90 adapted to be fitted with the notches 88. Accordingly, by engaging the pad 90 with the notches 88, the pad 90 is mounted on the actuator arm 32E. The number of pads to be mounted on the actuator arms is arbitrary. For example, the pads may be mounted on the disk opposing surfaces of all the actuator arms. Alternatively, a single pad may be mounted on the disk opposing surface of only one actuator arm. Further, a plurality of pads may be mounted on the disk opposing surface of only one actuator arm.

Figure 15:
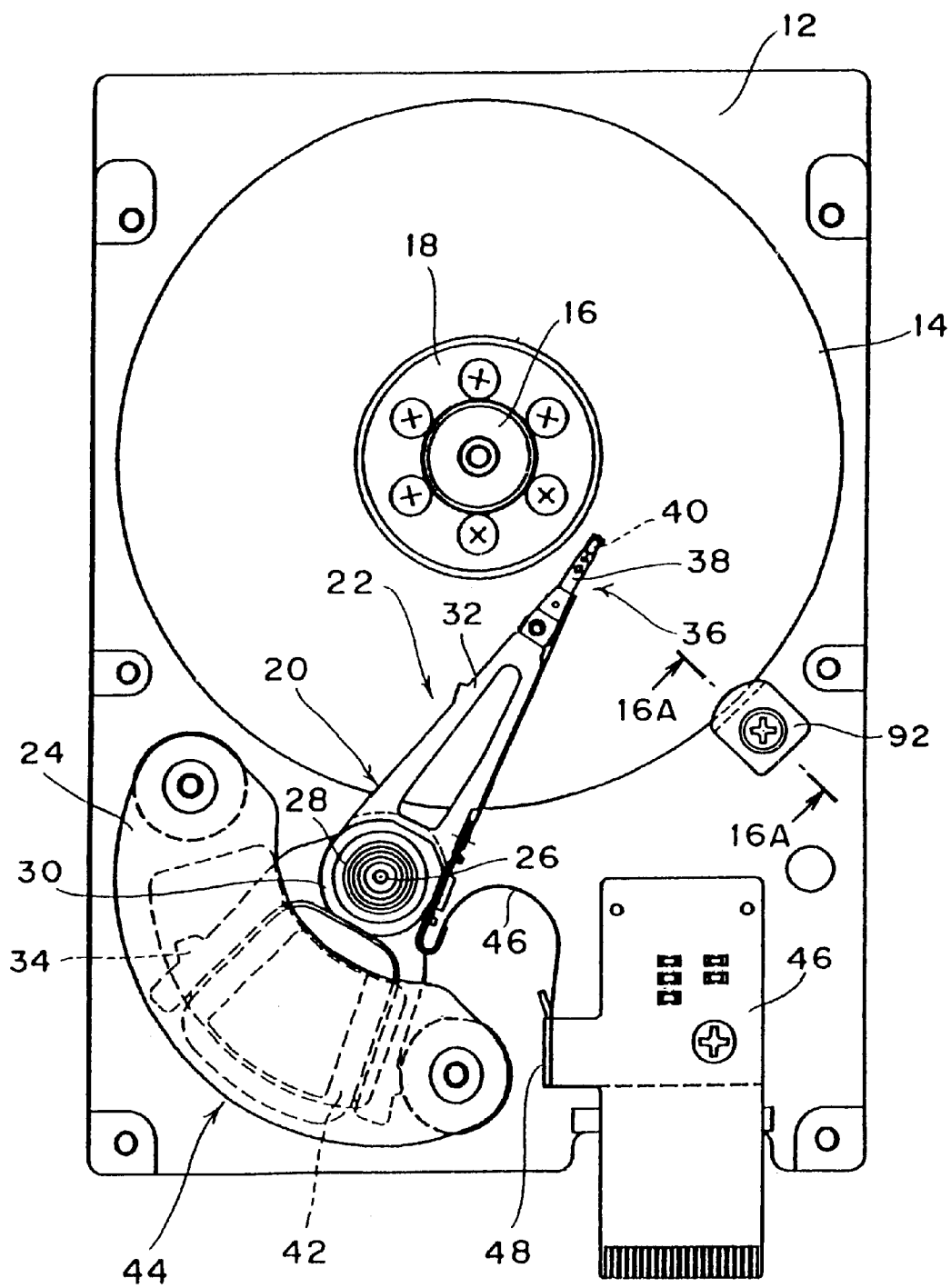
FIG. 15 is a plan view of a magnetic disk drive according to a sixth preferred embodiment of the present invention.
Figure 16:
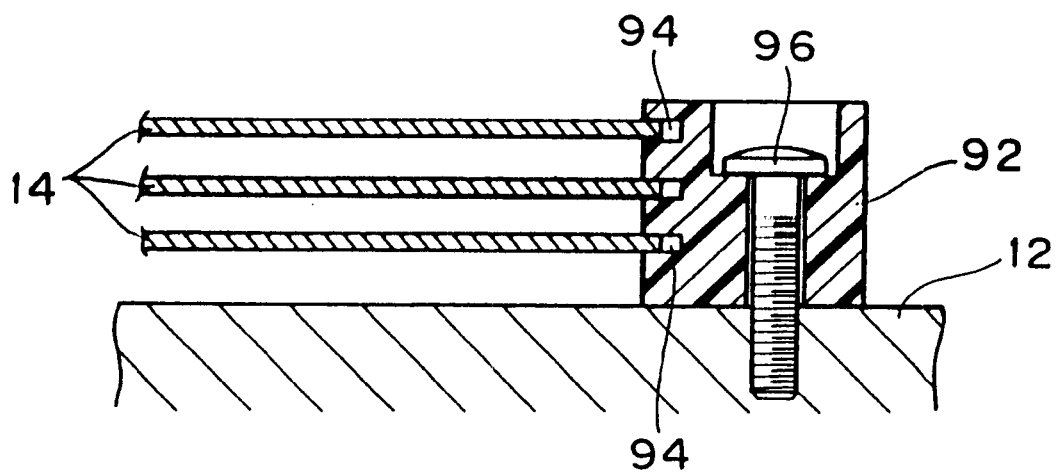
FIG. 16 is a cross section taken along the line 16A—16A in FIG. 15.

FIG. 15 is a plan view of a magnetic disk drive according to a sixth preferred embodiment of the present invention, and FIG. 16 is a cross section taken along the line 16A—16A in FIG. 15. As shown in FIG. 16, a stopper 92 having a plurality of grooves 94 is fixed to the base 12 by a screw 96, and the outermost circumferential portions of the plural magnetic disks 14 are inserted in the grooves 94 with a vertical clearance of about 0.1 to 0.2 mm. Preferably, the stopper 92 is formed of resin or rubber. According to this preferred embodiment, deformation of the magnetic disks 14 due to an external shock received can be prevented.

Figure 17:
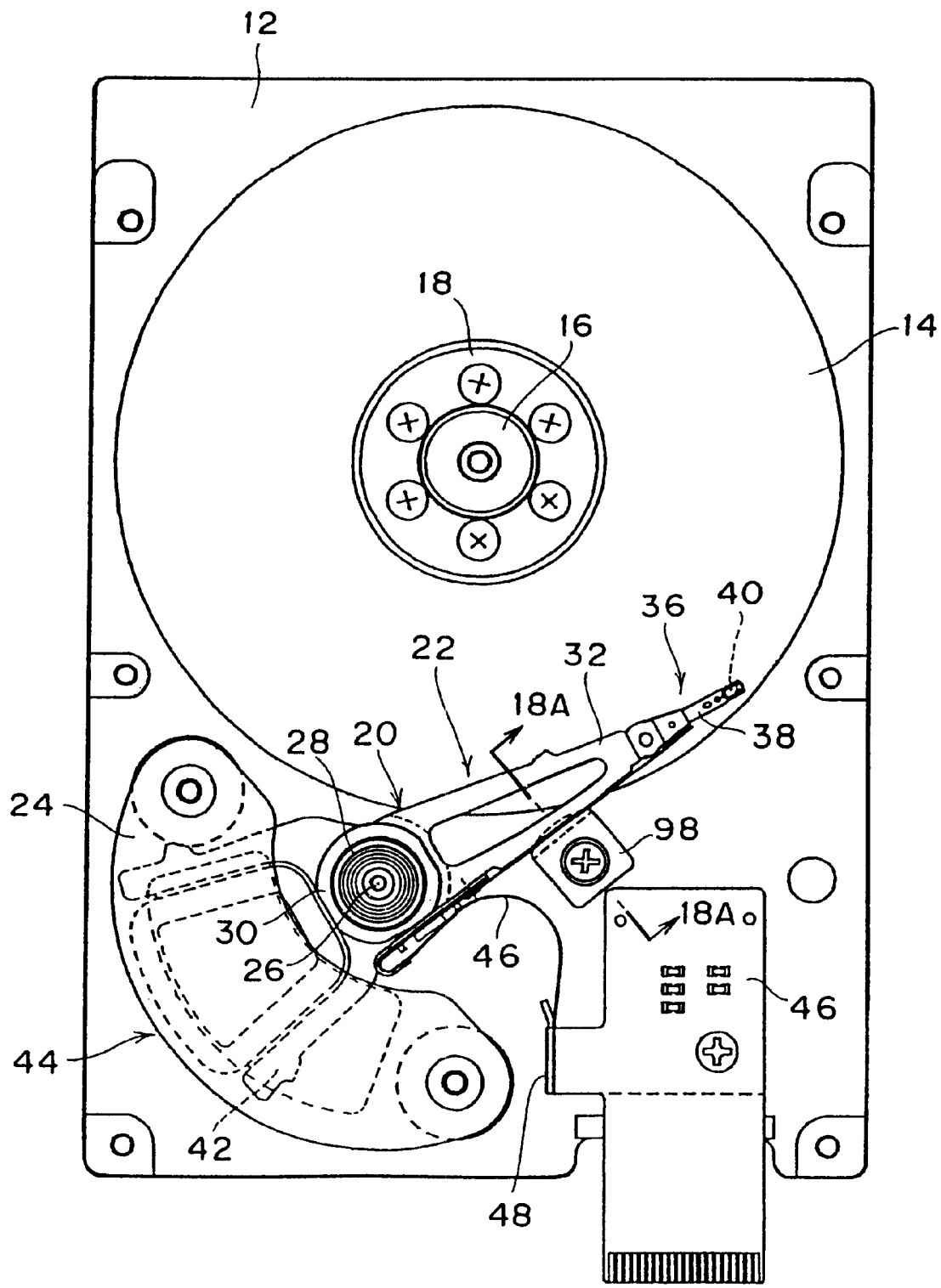
FIG. 17 is a plan view of a magnetic disk drive according to a seventh preferred embodiment of the present invention.
Figure 18:
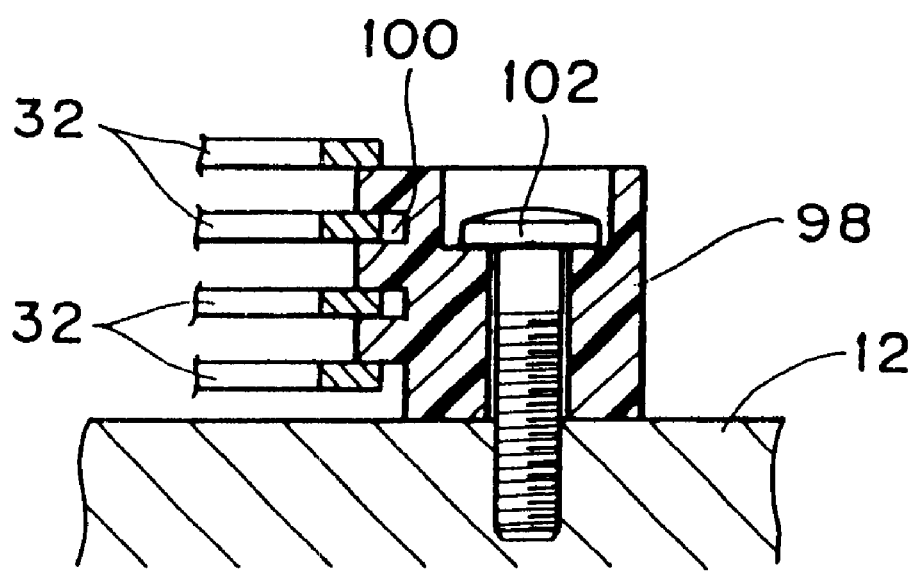
FIG. 18 is a cross section taken along the line 18A—18A in FIG. 17.

FIG. 17 is a plan view of a magnetic disk drive according to a seventh preferred embodiment of the present invention, and FIG. 18 is a cross section taken along the line 18A—18A in FIG. 17. FIG. 17 shows a CSS position of the actuator 20 where the actuator arms 32 are opposed to the outermost circumferential portions of the magnetic disks 14. As shown in FIG. 18, a stopper 98 having a plurality of grooves 100 is fixed to the base 12 by a screw 102, and the side edge portions of intermediate ones of the actuator arms 32 are inserted in the grooves 100 with a vertical clearance of about 0.1 to 0.2 mm.

When the actuator 20 is stopped in the CSS position as shown in FIG. 17, the side edge portions of the intermediate actuator arms 32 are inserted into the grooves 100 of the stopper 98. Accordingly, deformation of the actuator arms 32 due to an external shock received can be prevented to thereby prevent a contact of the front ends of the actuator arms 32 with the magnetic disks 14.

Figure 19:
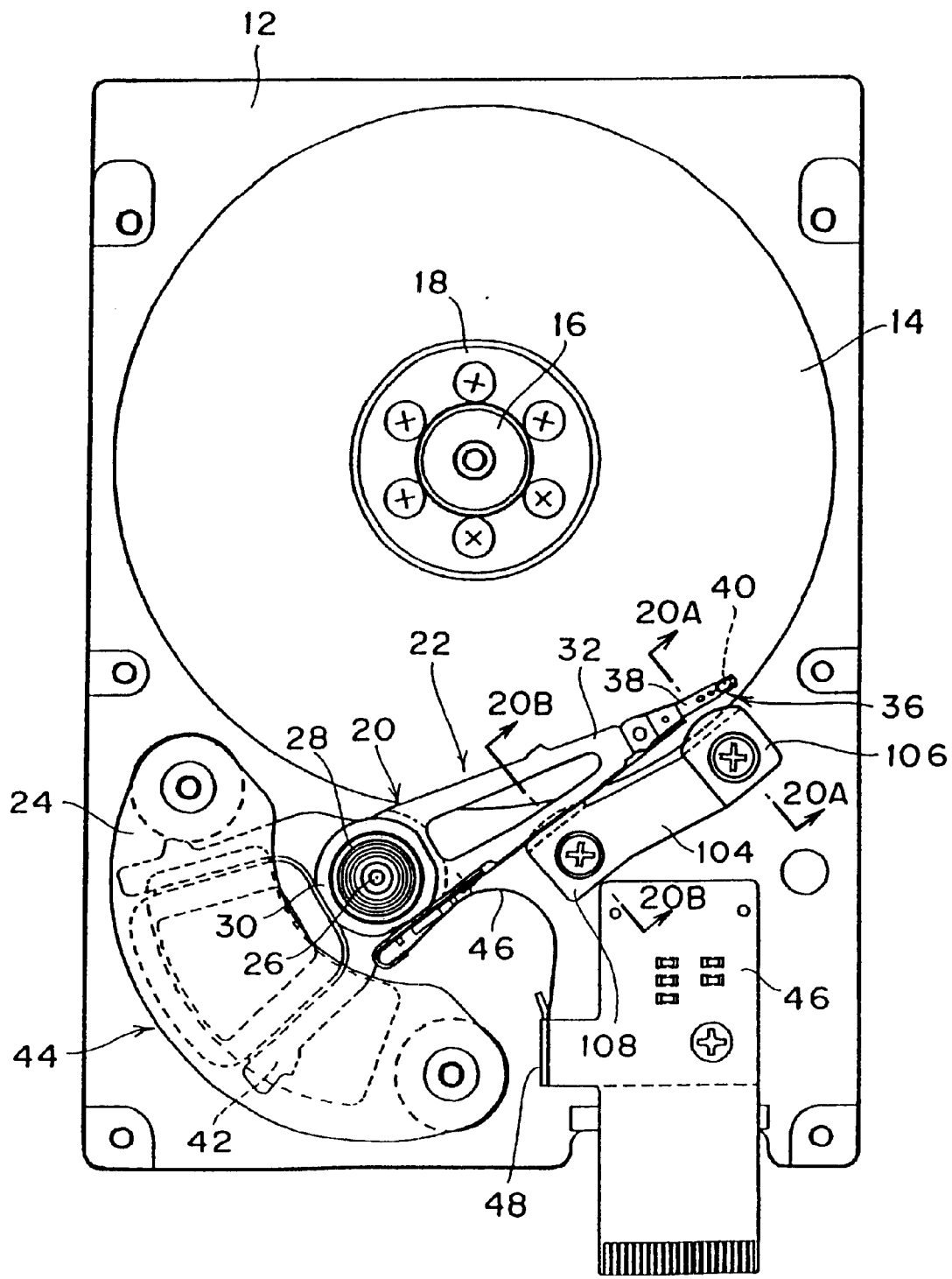
FIG. 19 is a plan view of a magnetic disk drive according to an eighth preferred embodiment of the present invention.
Figure 20A:
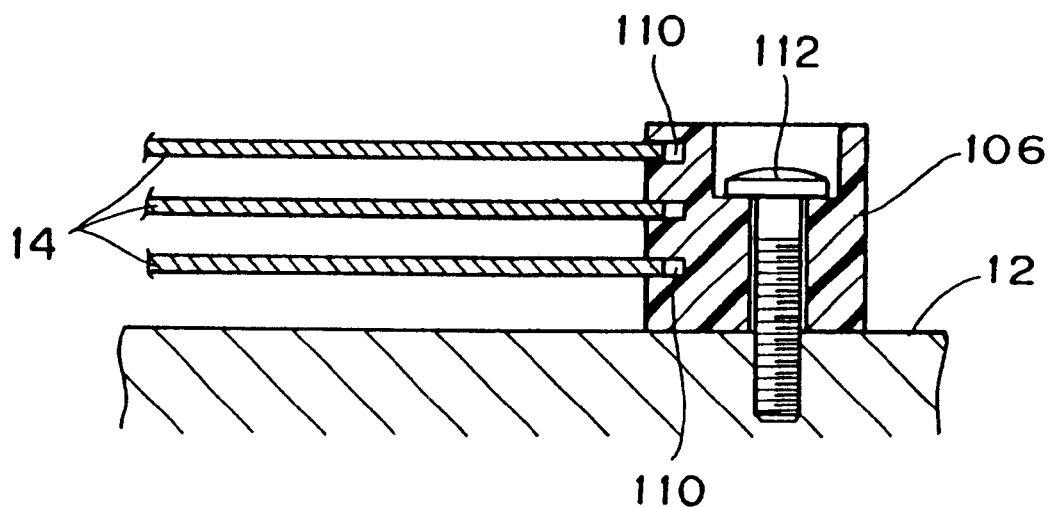
FIG. 20A is a cross section taken along the line 20A—20A in FIG. 19.
Figure 20B:
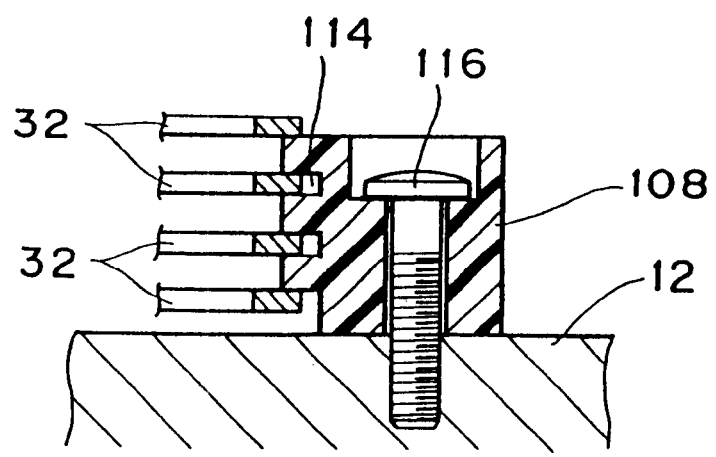
FIG. 20B is a cross section taken along the line 20B—20B in FIG. 19.

FIG. 19 is a plan view of a magnetic disk drive according to an eighth preferred embodiment of the present invention, FIG. 20A is a cross section taken along the line 20A—20A in FIG. 19, and FIG. 20B is a cross section taken along the line 20B—20B in FIG. 19. FIG. 19 shows a CSS position of the actuator 20 where the actuator arms 32 are opposed to the outermost circumferential portions of the magnetic disks 14. This preferred embodiment employs a stopper 104 consisting of a first stopper member 106 and a second stopper member 108 connected together.

As shown in FIG. 20A, the first stopper member 106 having a plurality of grooves 110 respectively receiving the outermost circumferential portions of the magnetic disks 14 is fixed to the base 12 by a screw 112. Similarly, as shown in FIG. 20B, the second stopper member 108 having a plurality of grooves 114 respectively receiving the side edge portions of the intermediate actuator arms 32 is fixed to the base 12 by a screw 116.

The outermost circumferential portions of the magnetic disks 14 are inserted in the grooves 110 of the first stopper member 106 with a vertical clearance of about 0.1 to 0.2 mm, and the side edge portions of the intermediate actuator arms 32 are inserted in the grooves 114 of the second stopper member 108 with a vertical clearance of about 0.1 to 0.2 mm. Preferably, the stopper 104 is formed of resin or rubber. According to this preferred embodiment, deformation of the magnetic disks 14 and the actuator arms 32 due to an external shock received can be prevented.

Figure 21:
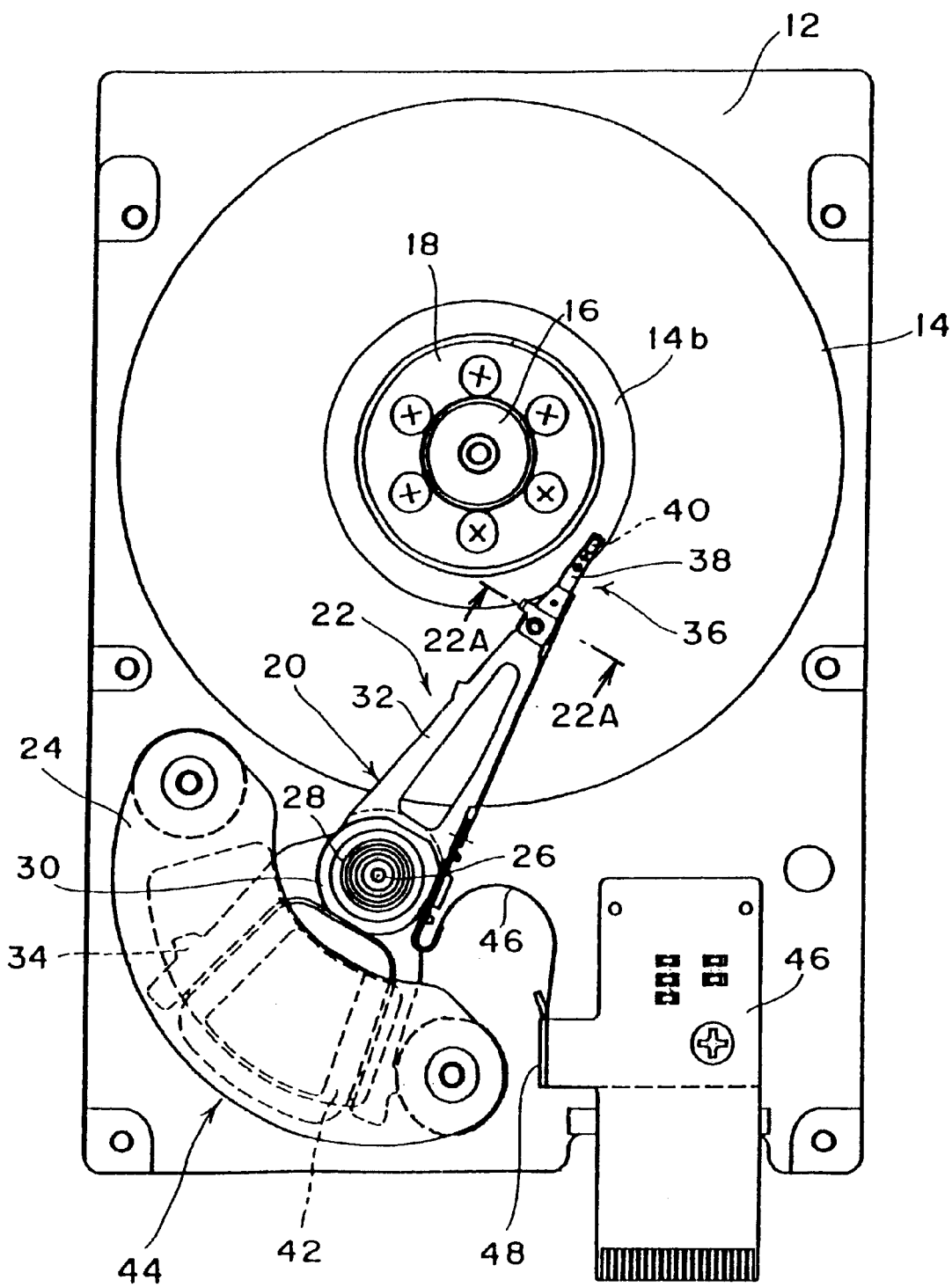
FIG. 21 is a plan view of a magnetic disk drive according to a ninth preferred embodiment of the present invention.
Figure 22:
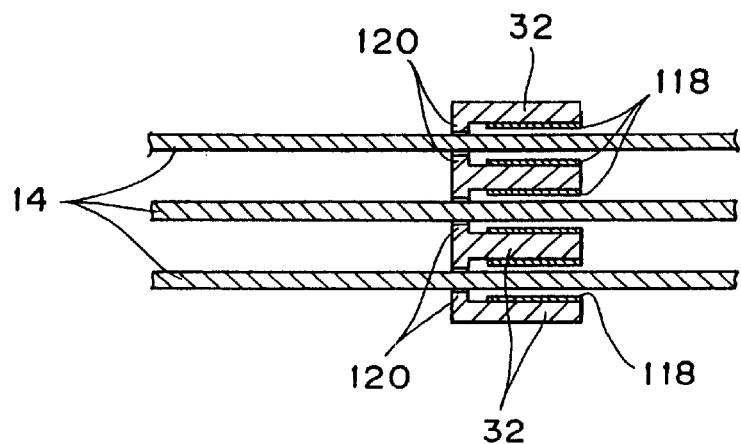
FIG. 22 is a cross section taken along the line 22A—22A in FIG. 21.

FIG. 21 is a plan view of a magnetic disk drive according to a ninth preferred embodiment of the present invention, and FIG. 22 is a cross section taken along the line 22A—22A in FIG. 21. In FIG. 22, reference numerals 118 denote spacers for use in crimping the suspensions 38 to the actuator arms 32. In this preferred embodiment, each actuator arm 32 is integrally formed at its one side edge with a vertical projection or projections 120 higher (thicker) than the spacers 118. Each projection 120 is located adjacent to one side edge of the corresponding spacer 118. While the projection or projections 120 are integral with the corresponding actuator arm 32 in this preferred embodiment, a separate projection or projections 120 may be mounted on the corresponding actuator arm 32.

In this preferred embodiment, the projections 120 move together with the actuator arms 32 above the disk surfaces of the magnetic disks 14 at a small height in reading/writing data, so that control of the height of each projection 120 is very important. Specifically, the height of each projection 120 must be set smaller than the thickness of at least the head slider 40 mounted on the corresponding suspension 38. A damage to the magnetic disks 14 due to an external shock received in the inoperative condition of the magnetic disk drive occurs primarily at a position opposed to the substantially front end portions of the actuator arms 32 to which the spacers 118 are fixed. This is considered to be caused by the fact that the magnetic disks 14 and the actuator arms 32 are vibrated upon receipt of an external shock, wherein the lightweight head assemblies 36 less damage the magnetic disks 14 and it is accordingly considered that the front end portions of the actuator arms. 32 most damage the magnetic disks 14.

According to this preferred embodiment, each spacer 120 is located adjacent to one side edge of the corresponding spacer 118. Accordingly, in the CSS position of the actuator 20 shown in FIG. 21, each projection 120 faces a non-data region 14b circularly formed along the inner circumference of the corresponding magnetic disk 14. As a result, even when the magnetic disk drive receives an external shock in the inoperative condition, each projection 120 comes into contact with the non-data region 14b of the corresponding magnetic disk 14. Thus, a damage to a data region of each magnetic disk 14 can be prevented.

Figure 23:
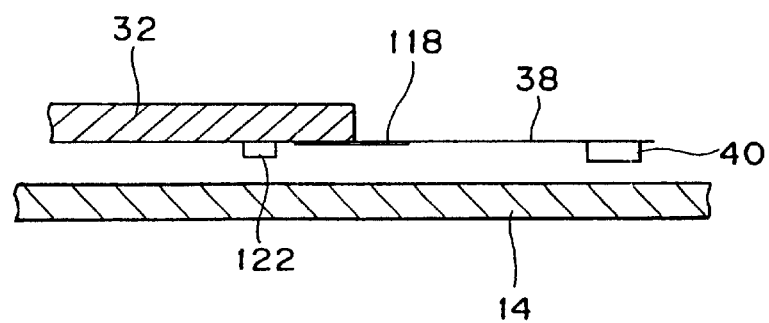
FIG. 23 is a schematic sectional view of a front end portion of an actuator arm in a magnetic disk drive according to a tenth preferred embodiment of the present invention.

Referring to FIG. 23, there is shown a schematic longitudinal section of the front end portion of an actuator arm according to a tenth preferred embodiment of the present invention. In this preferred embodiment, a pad 122 formed of resin or rubber is mounted on the disk opposing surface 32a of the actuator arm 32 at a position adjacent to the base end of a spacer 118. The pad 122 has a thickness smaller than the thickness of the head slider 40 mounted on the front end portion of the suspension 38. According to this preferred embodiment, the pad 122 formed of a material softer than that of the spacer 118 is mounted on the disk opposing surface 32a of the actuator arm 32 near the spacer 118. Accordingly, even when the magnetic disk drive receives an external shock, the pad 122 comes into contact with the magnetic disk 14 to thereby prevent a damage to the magnetic disk 14.

Figure 24:
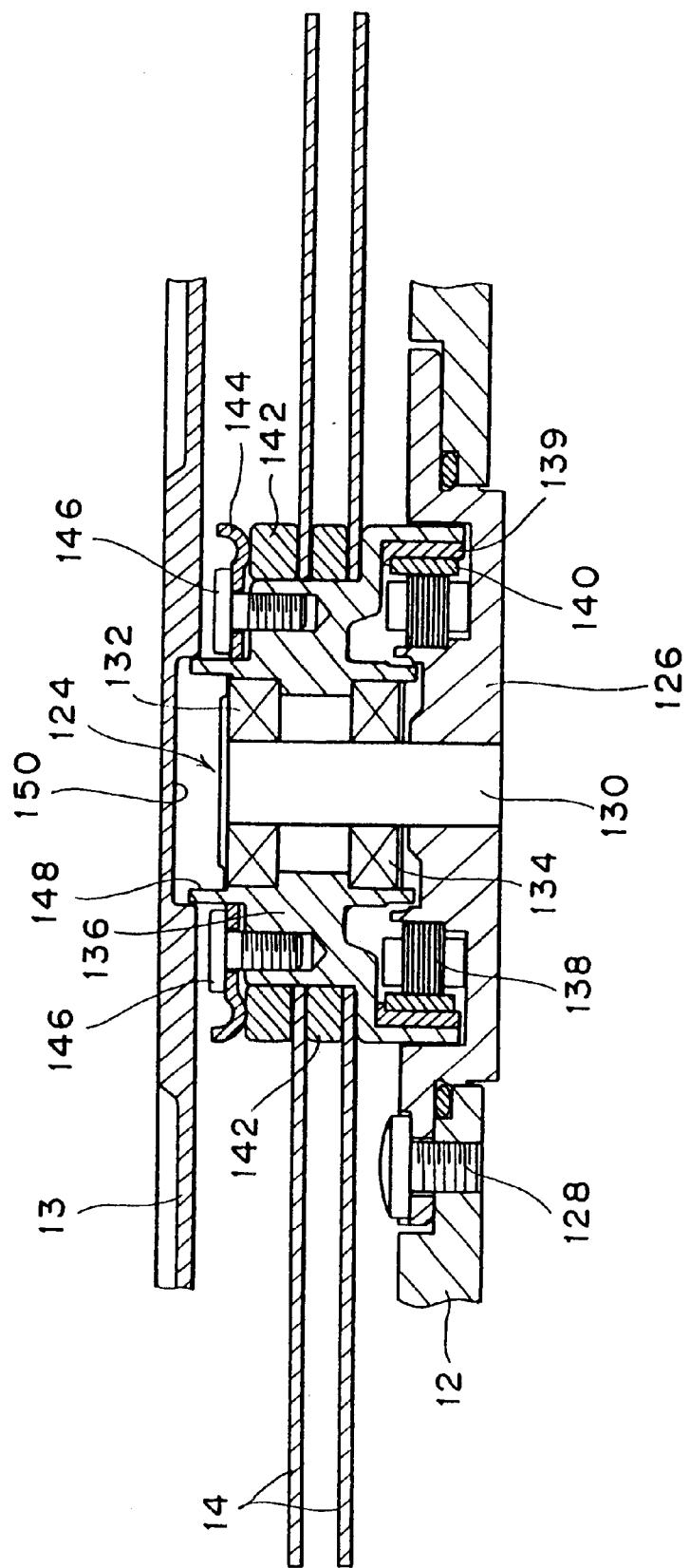
FIG. 24 is a sectional view of a spindle assembly in a magnetic disk drive according to an eleventh preferred embodiment of the present invention.

Referring to FIG. 24, there is shown a sectional view of a spindle assembly 124 in a magnetic disk drive according to an eleventh preferred embodiment of the present invention. A flange 126 is fixed to the base 12 by a plurality of screws 128 (one of which being shown). A shaft 130 is press-fitted with the flange 126. Coils 138 are mounted on the flange 126. A spindle hub 136 is rotatably mounted on the shaft 130 through a pair of bearings 132 and 134. Permanent magnets 140 are mounted on the spindle hub 136 so as to be opposed to the coils 138 through a yoke 139.

Magnetic disks 14 and spacers 142 are mounted on the spindle hub 136 in such a manner as to be alternately stacked, and a clamp 144 is fixed to the spindle hub 136 by screws 146, thereby mounting the magnetic disks 14 on the spindle hub 136 in equally spaced relationship with each other. The spindle hub 136 is integrally formed at its upper end with an annular projection 148. Reference numeral 13 denotes a cover of the magnetic disk drive. The cover 13 is formed with a circular recess 150 for receiving the annular projection 148 of the spindle hub 136. Preferably, there is defined an annular clearance of about 2 mm between the outer circumferential surface of the annular projection 148 and the inner wall surface of the circular recess 150.

The magnetic disk drive of this preferred embodiment has a single-supported spindle structure such that the shaft 130 is supported to the base 12 only. In general, such a single-supported spindle structure is inferior in shock resistance to a double-supported spindle structure. However, this preferred embodiment includes the annular projection 148 formed at the upper end of the spindle hub 136 and the circular recess 150 formed on the cover 13 for receiving the annular projection 148, thereby preventing a tilt of the spindle assembly 124 due to an external shock received.

According to one aspect of the present invention, a pad is provided on the disk opposing surface of an actuator arm.

Accordingly, even when the magnetic disk drive receives an external shock, the pad provided on the actuator arm comes into contact with the outermost circumferential portion of a magnetic disk, thereby limiting a tilt of the actuator arm or a spindle to prevent a contact of the front end of the actuator arm with a data region on the disk surface.

According to the another aspect of the present invention, a stopper for limiting a vertical displacement of the magnetic disk and/or the actuator arm is fixed to the base, thereby preventing a deformation of the disk and the actuator arm.

According to a further aspect of the present invention, there is provided a magnetic disk drive having a single-supported spindle structure wherein an annular projection is formed integrally at the upper end of a spindle hub, and a circular recess for receiving the annular projection is formed on a cover. With this configuration, a tilt of the spindle due to an external shock received can be prevented.

What is claimed is:

1. A disk drive comprising:

a housing having a base and a cover fixed to said base;

a disk rotatably mounted in said housing and having a plurality of tracks;

a rotating mechanism for rotating said disk;

a head slider having a transducer for reading/writing data on said disk;

an actuator for moving said head slider across said tracks of said disk, said actuator having an actuator arm rotatably mounted on said base; and a stopper for physically blocking said actuator arm from further radially outward movement when said head slider is aligned to directly oppose an outermost circumferential portion of said disk, said stopper being fixed to said base, said stopper having a groove for receiving the outermost circumferential portion of said disk with a given vertical clearance.

2. The disk drive as recited in claim 1, wherein a suspension is attached to said actuator arm and said stopper physically blocks said actuator arm by contacting said suspension.

3. The disk drive as recited in claim 1, further including a second stopper having a plurality of grooves for receiving said actuator arms.

4. The stopper as recited in claim 3, wherein said grooves each have a given vertical clearance of between 0.1 mm and 0.2 mm.

5. A disk drive comprising:

a housing having a base and a cover fixed to said base;

a disk rotatably mounted in said housing and having a plurality of tracks;

a rotating mechanism for rotating said disk;

a head slider having a transducer for reading/writing data on said disk;

an actuator for moving said head slider across said tracks of said disk, said actuator having a plurality of actuator arms rotatably mounted on said base; and a stopper fixed to said base, said stopper having a plurality of grooves, with each groove being configured and arranged for receiving only a single one of said actuator arms with a given vertical clearance, said actuator arm being received within said groove when said actuator arm is at its radially outermost position.

6. The disk drive as stated in claim 5 further comprising a second stopper that is integrally formed with said stopper, said second stopper being fixed to said base and having a second groove for receiving said actuator arm in a specific position of said actuator upon stoppage of driving of said disk drive.

7. The stopper as recited in claim 5, wherein said grooves each have a given vertical clearance of between 0.1 mm and 0.2 mm.

8. The disk drive as recited in claim 5, wherein said transducer opposes said disk when said actuator arm is in said radially outermost position.

9. A disk drive comprising:

a housing having a base and a cover fixed to said base;

a disk rotatably mounted in said housing and having a plurality of tracks;

a rotating mechanism for rotating said disk;

a head slider having a transducer for reading/writing data on said disk;

an actuator for moving said head slider across said tracks of said disk, said actuator having an actuator arm rotatably mounted on said base;

a first stopper fixed to said base, said first stopper having a first groove for receiving an outermost circumferential portion of said disk with a given vertical clearance; and a second stopper fixed to said base and having a second groove for receiving said actuator arm in a specific position of said actuator upon stoppage of driving of said disk drive, said second groove having a given vertical clearance with respect to said actuator arm;

wherein said first stopper is positioned adjacent a first circumferential position of said disk, said second stopper is positioned adjacent a second circumferential position of said disk, and said first circumferential position is different from said second circumferential position; and further wherein said actuator arm is received within said second groove when said actuator arm is at its radially outermost position.

10. The stopper as recited in claim 9, wherein said first groove has a given vertical clearance of between 0.1 mm and 0.2 mm and said second groove has a given vertical clearance of between 0.1 mm and 0.2 mm.

11. The disk drive as recited in claim 9, wherein said first stopper and said second stopper are integrally formed as a single unit.

12. The disk drive as recited in claim 9, wherein said transducer opposes said disk when said actuator arm is in said radially outermost position.

* * * * *

UNITED STATES PATENT AND TRADEMARK OFFICE
CERTIFICATE OF CORRECTION

PATENT NO.     : 6,341,051 B2                                        Page 1 of 1
DATED          : January 22, 2002
INVENTOR(S)    : Hachiya et al.

It is certified that error appears in the above-identified patent and that said Letters Patent is hereby corrected as shown below:

<u>Title page,</u>
Item [56], References Cited, the following references should also be cited in the issued patent:
                U.S. PATENT DOCUMENTS
4,939,611     Connelly     Jul. 3, 1990
5,239,431     Day et al.     Aug. 24, 1993
5,754,371     Meyer et al.   May 19, 1998
5,864,444     Baker et al.   Jan. 26, 1999
                FOREIGN PATENT DOCUMENTS
6-231549      Japan        Aug. 19, 1994
7-121975      Japan        May 12, 1995
7-320431      Japan        Dec. 8, 1995
8-297817      Japan        Nov. 12, 1996
9-63215        Japan        Mar. 7, 1997
In the Masthead below Item [12], delete "Hachiya et al" and insert -- Hachiya -- therefor.
Item [75], delete "Tomoyoshi Yamada," "Hiroshi Takekawa," "Takuya Kobaysahi," and "Yuji Sasaki."

Signed and Sealed this

Seventeenth Day of September, 2002

*Attest:*

*Attesting Officer*

JAMES E. ROGAN
*Director of the United States Patent and Trademark Office*